US011907422B2

(12) United States Patent
Cartigny et al.

(10) Patent No.: US 11,907,422 B2
(45) Date of Patent: Feb. 20, 2024

(54) SETTING UP A COMMUNICATION VIA ANALYSIS OF EYE MOVEMENTS

(71) Applicant: Orange, Issy-Les-Moulineaux (FR)

(72) Inventors: Jean Cartigny, Chatillon (FR); Thomas Maherault, Chatillon (FR)

(73) Assignee: Orange, Issy les Moulineaux (FR)

( * ) Notice: Subject to any disclaimer, the term of this patent is extended or adjusted under 35 U.S.C. 154(b) by 117 days.

(21) Appl. No.: 17/633,820

(22) PCT Filed: Jul. 31, 2020

(86) PCT No.: PCT/FR2020/051420
§ 371 (c)(1),
(2) Date: Feb. 8, 2022

(87) PCT Pub. No.: WO2021/028630
PCT Pub. Date: Feb. 18, 2021

(65) Prior Publication Data
US 2022/0300074 A1    Sep. 22, 2022

(30) Foreign Application Priority Data
Aug. 9, 2019   (FR) ...................... 1909125

(51) Int. Cl.
G06F 3/01          (2006.01)
G06T 7/70          (2017.01)
(Continued)

(52) U.S. Cl.
CPC ............... *G06F 3/013* (2013.01); *G06T 7/20* (2013.01); *G06T 7/70* (2017.01); *H04W 76/11* (2018.02); *G06T 2207/30201* (2013.01)

(58) Field of Classification Search
CPC ... G06F 3/013; G06T 7/20; G06T 7/70; G06T 2207/30201; H04W 76/11
See application file for complete search history.

(56) References Cited

U.S. PATENT DOCUMENTS

2012/0019662 A1 * 1/2012 Maltz ...................... G06F 3/013
                                                          348/158
2014/0062876 A1 * 3/2014 Tsou ....................... G06F 3/013
                                                          345/158
(Continued)

FOREIGN PATENT DOCUMENTS

EP    0816983 A2    1/1998
EP    2919109 A1    9/2015

OTHER PUBLICATIONS

International Search Report dated Jan. 14, 2021 for corresponding International Application No. PCT/FR2020/051420, dated Jul. 31, 2020.

(Continued)

*Primary Examiner* — Abbas I Abdulselam
(74) *Attorney, Agent, or Firm* — David D. Brush; Westman, Champlin & Koehler, P.A.

(57) ABSTRACT

A method for setting up a communication intended for at least one terminal of at least one second user via analysis of eye movements of a first user. The method is implemented by a device for setting up a communication via analysis of the eye movements of the first user. The device possesses at least one camera, and at least one region of interest is associated, via an identification datum, with the at least one terminal of the at least one second user. The method includes: capturing eye movements with the camera; analysing the captured eye movements; evaluating a duration for which the analysis of the eye movements indicates that a gaze of the user remains directed towards the region of interest; and, when the evaluation indicates that this duration is longer than a threshold, transmitting at least one first message to the at least one terminal identified via the identification datum.

15 Claims, 3 Drawing Sheets

Figure 1:
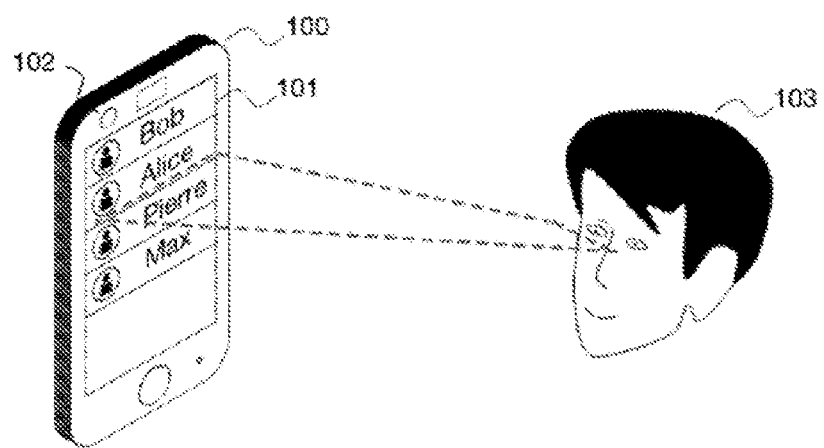

(51) Int. Cl.
*H04W 76/11* (2018.01)
*G06T 7/20* (2017.01)

(56) References Cited

U.S. PATENT DOCUMENTS

| | | | | |
|---|---|---|---|---|
| 2015/0288923 | A1* | 10/2015 | Kim | H04N 23/62 |
| | | | | 348/14.05 |
| 2015/0346814 | A1* | 12/2015 | Thukral | H04N 7/18 |
| | | | | 345/156 |
| 2017/0075419 | A1* | 3/2017 | Parthasarathy | G06F 3/013 |
| 2017/0103472 | A1* | 4/2017 | Shah | H04L 9/32 |
| 2017/0308162 | A1* | 10/2017 | Xu | G06F 16/436 |

OTHER PUBLICATIONS

Written Opinion of the International Searching Authority dated Jan. 14, 2021 for corresponding International Application No. PCT/FR2020/051420, filed Jul. 31, 2020.
English translation of the Written Opinion of the International Searching Authority dated Jan. 25, 2021 for corresponding International Application No. PCT/FR2020/051420, filed Jul. 31, 2020.
John Paulin Hansen et al, "Command Without a Click: Dwell Time Typing by Mouse and Gaze Selections", 2003, p. 121-128, Retrieved from the Internet: URL:https://backend.orbit.dtu.dk/ws/portalfiles/portal/120329054/Command_Without_a_Click.pdf, XP055680846.
Jingjing Zhi, "Evaluation of tactile feedback on dwell time progression in eye typing", Jan. 2014 (Jan. 2014), Retrieved from the Internet: URL:https://trepo.tuni.fi/bitstream/handle/10024/94973/gradu07179.pdf?sequence=1&isAllowed=y, XP055680900.

* cited by examiner

SETTING UP A COMMUNICATION VIA ANALYSIS OF EYE MOVEMENTS

CROSS-REFERENCE TO RELATED APPLICATIONS

This Application is a Section 371 National Stage Application of International Application No. PCT/FR2020/051420, filed Jul. 31, 2020, which is incorporated by reference in its entirety and published as WO 2021/028630 A1 on Feb. 18, 2021, not in English.

1. FIELD OF THE INVENTION

The invention pertains to the field of telecommunications, and relates more particularly to a method for initiating and/or maintaining a communication through the analysis of eye movements.

2. PRIOR ART

The boom in modern communication technologies is being accompanied by new types of use every day. Connected terminals in particular have become widespread and nowadays occupy a central role in the lives of their users, rapidly guiding them toward new types of use. Their users are now able to be reached at any time using a whole variety of techniques, and share all kinds of information with others, when and for as long as they wish.

The use of these terminals takes up a large part of their owners' time because the types of use are highly varied: Internet, communications, diary, reading, photos, videos, television, games, etc. Terminals thus have to offer a particularly effective interface such that users do not waste time with technical manipulations and that the information of use is available immediately. They should also, as far as possible, assist users in terms of taking charge of these services, whatever these may be, by providing accessibility tools.

At present, in order to establish a communication, it is customary to select the contact to call from the address book of one's communication application or to enter the identifier of the called party, such as a telephone number or an email address, directly in the user interface. The user also has the option of using a voice assistant which, after having interpreted the command uttered, will take responsibility for establishing the communication.

All of these solutions require a certain number of manipulations in order to ultimately establish the communication. The user at least has to go through a step of entering or activating the voice assistant, more often than not performed via manipulations on the terminal or through voice commands.

3. DISCLOSURE OF THE INVENTION

The invention aims to improve the prior art by using eye tracking systems that combine a set of techniques for recording and analyzing the eye movements of a person. The most common eye trackers analyze images of the human eye as captured by a camera, often in infrared light, to compute and determine the gaze direction.

To this end, it proposes a method for establishing a communication to at least one terminal of at least one second user by analyzing the eye movements of a first user, said method being implemented by a device for establishing a communication by analyzing the eye movements of said first user, said device having at least one camera and at least one area of interest associated, via an item of identification data, with said at least one terminal of said at least one second user, and characterized in that the method comprises:
  a step of said camera capturing eye movements,
  a step of analyzing the captured eye movements,
  a step of evaluating a duration for which the analysis of the eye movements indicates that the gaze of said first user remains directed toward said area of interest, and when the evaluation indicates that this duration is greater than a threshold,
  a step of transmitting at least one first message to said at least one terminal identified via said item of identification data.

Advantageously, the method makes it possible to limit physical interactions with the device. This allows for example a disabled user having no or limited gripping capabilities to establish a communication with for example an emergency service, a doctor or a relative. Likewise, a worker in industry or a surgeon, performing tasks requiring exclusive use of their arms and/or their hands for the requirements of their work, may establish a communication with for example a conversational assistant, a supervisor or a colleague in order to obtain for example information about an intervention protocol or make an emergency call.

The communication may be established for example when the user stares at a button, a screen, an element displayed on a screen, a light-emitting diode or any other part of the device for a given time interval.

Not having to touch the device also allows people with low immunity to eliminate any contact with a device potentially carrying germs or other viruses. Indeed, it has been proven that terminals, and more particularly screens, are vectors of microbes and bacteria.

In addition, such a method makes it possible to dispense with the language used/configured on the device and the written transcription thereof. To trigger the establishment of the communication, the user does not need to utter a command out loud or to know how to read the menus displayed in a particular language. Said user just needs to fix his gaze on all or part of the device for a given time period. This makes it possible to limit the cost of implementing such a device. It should be noted that the communication may be established to multiple terminals. This is for example the case when the user wishes to inform multiple relatives/emergency services about a problem, such as for example a fall. This thus makes it possible to optimize the response time of the emergency services.

An area of interest is understood to mean all or part of the determined device and that makes it possible to associate therewith an identifier of the user and/or of his terminal in order to establish a communication therewith.

A message is understood to mean any message allowing communication with the terminal, such as SMS/MMS, signaling messages for example for initializing telephone/videophone communications via an IP or circuit-switched network, instant messaging messages including status notifications, emails or any other message for exchanging information between the device and the terminal via a telecommunications channel, such as for example a telecommunications network or a Bluetooth peer-to-peer/Wi-Fi Direct link.

According to one particular mode of implementation of the invention, a method as described above is characterized in that the transmission step is followed by the following steps:
  a second step of said camera capturing eye movements, a second step of analyzing the captured eye movements, and when the analysis indicates that the gaze of said first user is no longer directed toward said area of interest, a second step of transmitting at least one third message to said at least one terminal identified via said item of identification data.

Advantageously, this embodiment allows the user, if the third message is an end of communication message, to maintain the communication with his contact partner for as long as his gaze remains directed toward the area of interest. The communication thus ends as soon as the user looks away from the area in question. In another embodiment, the third message may also be a message allowing the transmission of data such as text, photos/videos or even a communication status.

According to one particular mode of implementation of the invention, a method as described above is characterized in that said at least one first message is a message requesting establishment of a bidirectional communication between said device and said at least one terminal.

Advantageously, this embodiment makes it possible to establish a bidirectional communication between the device and the terminal in order to have a real-time exchange between the first and the second user. The bidirectional communication may be for example a voice, videophone or text-based communication.

According to one particular mode of implementation of the invention, a method as described above is characterized in that the transmission step is followed by the following steps:

a step of receiving at least one second message from said at least one terminal, a validation step on said device.

This mode of implementation of the invention allows the user of the device to validate the establishment of a communication between the device and the terminal and thus to ensure that the user of the device actually wishes to establish the communication with the user of the terminal. The validation may also be performed automatically by the device according to rules that are defined by the user, such as the date, the time, the called party, etc.

According to one particular mode of implementation of the invention, a method as described above is characterized in that the area of interest is at least part of a screen. This mode of implementation of the invention makes it possible for example to contextualize the display by dividing the screen into multiple areas of interest, and therefore to establish communications with various contact partners. This may for example be telephone numbers displayed by way of a browser, for example in the form of hypertext links. Of course, the area of interest may occupy the whole screen.

According to one variant of this particular embodiment of the invention, the method as described above is characterized in that the area of interest is a contact card associated with said at least one second user.

This mode of implementation of the invention makes it possible for example to ensure that it will be possible to establish the communication only when the user is located in the tree structure of the human-machine interface of the device in the contact card of the called party, and thus prevent any unwanted communications.

According to one particular mode of implementation of the invention, a method as described above is characterized in that said duration is rendered on the device via a progress bar.

This mode of implementation of the invention makes it possible to give visual feedback to the user regarding the progress status of the method and the period or threshold for triggering the sending of the message to the called party. It should be noted that this threshold may be configurable and configured by the user himself.

This rendering may also be implemented by way of two displays: The first at the start and the second at the end of the time interval corresponding to the duration for which the user's gaze remains directed toward the area of interest. This may for example be a light-emitting diode that flashes at the start and at the end of the time interval or else an icon whose color changes at the end of the duration.

According to one particular mode of implementation of the invention, a method as described above is characterized in that said duration is rendered on the device via a sound or a vibration.

This mode of implementation of the invention makes it possible to give feedback to the user regarding the progress status of the method and the period or threshold for triggering the sending of the message to the called party. It should be noted that this threshold may be configurable and configured by the user himself. The user may also configure the acoustic volume, an audio sequence or a vibration sequence, or even define an intensity of the sound or of the vibration, which for example crescendoes. The duration may also be rendered through two audio sequences or two sequences of vibrations, the first at the start and the second at the end of the time interval corresponding to the duration for which the user's gaze remains directed toward the area of interest.

According to one particular mode of implementation of the invention, a method as described above is characterized in that the transmission step is preceded by a validation step on the device performed by the first user.

Advantageously, this mode of implementation allows the user to validate or cancel the sending of the communication establishment message. This action may for example be implemented through a particular eye movement, a head movement, a voice command, the pressing of a hardware or software button, or any other interaction with the human-machine interface of the device.

The invention also relates to a method for communication between a first terminal of a first user and a second terminal of a second user each comprising a device for establishing a communication to at least one terminal by analyzing the eye movements of a user, said terminals having at least, respectively, a first and a second camera and at least, respectively, a first and a second area of interest associated, respectively, with the second and with the first terminal, and characterized in that the method comprises:

a step of said camera of said first terminal capturing the eye movements of said first user, a step of said camera of said second terminal capturing the eye movements of said second user, a step of said first terminal analyzing the eye movements captured by said first terminal, a step of said second terminal analyzing the eye movements captured by said second terminal, a step of said first terminal evaluating a first duration for which the analysis of the eye movements indicates that the gaze of the user of the first terminal remains directed toward said first area of interest, and when the evaluation indicates that this duration is greater than a first threshold, a step of said first terminal transmitting at least one first message to said at least one second terminal, a step of said second terminal evaluating a second duration for which the analysis of the eye movements indicates that the gaze of the user of the second terminal remains directed toward said second area of interest, and when the evaluation indicates that this second duration is greater than a second threshold, a step of said second terminal transmitting at least one second message to said at least one first terminal, a step of establishing a communication between said first terminal and said second terminal if said at least one second message is received, following the transmission step performed on said first terminal, by said at least one first terminal within a time interval.

This mode of implementation of the invention makes it possible to trigger informal communication remotely and spontaneously. When two users simultaneously look for example at the contact card of one another on their device, a negotiation is established between the two devices. If they maintain visual contact for a given time period, then a communication is initiated in a natural way between the two users.

This makes it possible for example to ensure the availability of one's contact partner before transmitting a call request and to limit call rejections.

According to one variant of this particular embodiment of the invention, the method as described above is characterized in that the transmission step performed on said first terminal is followed by a step of rendering, on said first terminal, a second period representing said time interval for which the reception of said at least one second message by said first terminal allows the communication to be established. Advantageously, this mode of implementation makes it possible to give the user an indication of the period for which the communication with the remote terminal will be possible. After this period, the user will have the information that the attempt to establish the communication has failed. The period may be rendered for example through vibrations, sounds, or a dedicated display.

The invention also relates to a device for establishing a communication to at least one terminal of at least one second user by analyzing the eye movements of a first user, said device having at least one camera and at least one area of interest associated, via an item of identification data, with said at least one terminal of said second user, and characterized in that the device comprises:

a transceiver module for transmitting at least one first message to said at least one terminal identified via said item of identification data, an analysis module for analyzing the eye movements of said first user as captured by said camera, an evaluation module for evaluating a duration for which the analysis of the eye movements indicates that the gaze of the first user remains directed toward said area of interest.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention also relates to a terminal, characterized in that it comprises a device for establishing a communication as described above.

The invention also relates to a system for communication between a first and a second terminal, the terminals respectively comprising a device for establishing a communication as described above, characterized in that the transceiver module of the first terminal also allows the reception of at least one second message transmitted by said second terminal and the establishment of a communication to said second terminal.

The invention also relates to a system for establishing a communication to at least one terminal of at least one second user by analyzing the eye movements of a first user, said system having at least one camera and at least one area of interest associated, via an item of identification data, with said at least one terminal of said second user, and characterized in that the system comprises:

a first device comprising means for establishing a communication, a second device comprising means for analyzing eye movements captured by said camera, a third device comprising means for evaluating the duration for which the analysis of the eye movements indicates that the gaze of said first user remains directed toward said area of interest, the devices being designed such that, when the evaluation indicates that said duration is greater than a threshold, this triggers the sending of a message from said first device to said at least one terminal identified via said item of identification data.

The invention also relates to a computer program comprising instructions for implementing any one of the above methods according to any one of the particular embodiments described above when said program is executed by a processor.

The method may be implemented in various ways, in particular in hard-wired form or in the form of software. This program may use any programming language and be in the form of source code, object code or intermediate code between source code and object code, such as in a partially compiled form, or in any other desirable form. The invention also targets a computer-readable recording medium or information medium containing instructions of a computer program such as mentioned above. The abovementioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

This device for establishing a communication to a terminal by analyzing the eye movements of a user and this computer program have features and advantages analogous to those described above in relation to the method for establishing a communication to a terminal by analyzing the eye movements of a user.

4. LIST OF THE FIGURES

Figure 2:
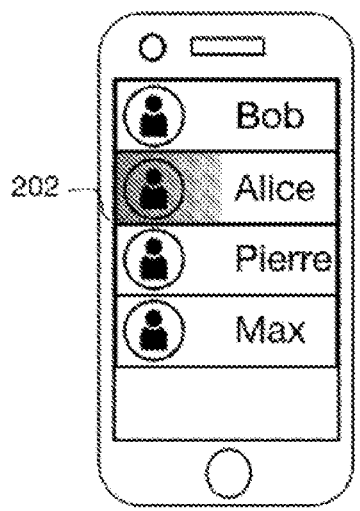
Figure 3:
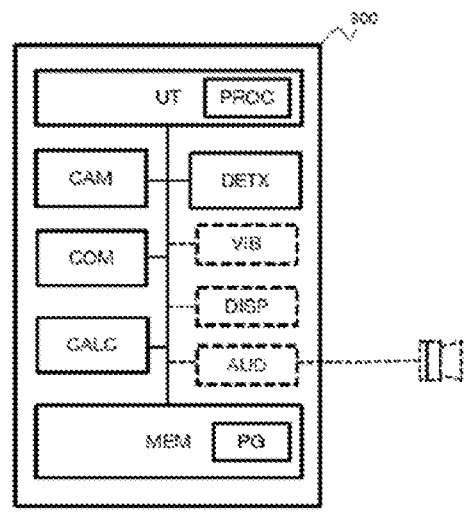
Figure 4:
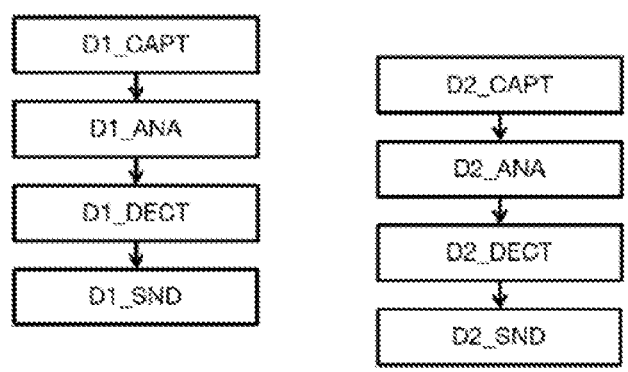
Figure 5:
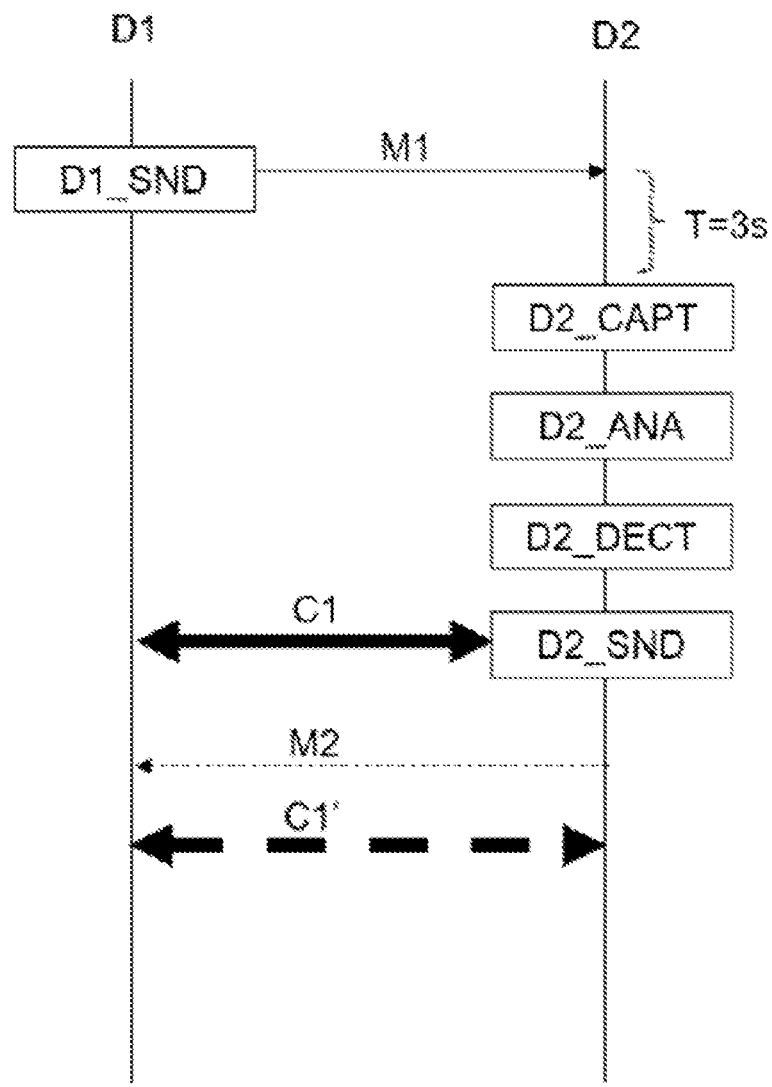

Other features and advantages of the invention will become more clearly apparent upon reading the following description of particular embodiments, provided by way of simple illustrative and nonlimiting examples, and the appended drawings, in which:

FIG. 1 illustrates an example of an environment for implementing the invention, according to one particular embodiment of the invention, FIG. 2 illustrates an example of a display on a device designed to implement the method for establishing a communication to at least one terminal by analyzing the eye movements of a user, according to one particular embodiment of the invention, FIG. 3 illustrates the architecture of a device designed to implement the method for establishing a communication to at least one terminal by analyzing the eye movements of a user, according to one particular embodiment of the invention, FIG. 4 illustrates the main steps of the method for establishing a communication to at least one terminal by analyzing the eye movements of a user, according to one particular embodiment of the invention, FIG. 5 illustrates the main steps of the method for establishing a communication to at least one terminal by analyzing the eye movements of a user, according to a second particular embodiment of the invention.

5. DESCRIPTION OF ONE EMBODIMENT OF THE INVENTION

FIG. 1 illustrates an example of an environment for implementing the invention, according to one particular embodiment. The environment shown in FIG. 1 comprises a terminal 100 implementing the device and the method according to the present invention.

According to this embodiment, the terminal 100 incorporates the device for establishing a communication. According to other embodiments, the device for establishing a communication may be located in the network and/or distributed over one or more computing machines such as computers, terminals or servers.

The terminal 100 is for example a smartphone terminal, a tablet, a television set connected to a communication network, a connected object, an autonomous car, a personal computer or any other terminal having a camera and making it possible to establish electronic communications. In the example described here, the terminal 100 is a smartphone having a camera (102) and designed to display, on its screen, a list of contacts (101) with which there are associated for example telephone numbers, e-mail addresses, pseudonyms or any other item of data for reaching and/or communicating with the contacts in the list, for example by way of SMS/MMS, telephone/videophone calls, instant messages, e-mails etc. The list of contacts may be stored on the terminal or else be accessible from the network.

The method may operate continually and autonomously on the device integrated into the terminal as soon as the terminal 100 is activated, or else following a user action, or even during time ranges defined by the user. As soon as the method is operational, the analysis of the eye movements of users present in the capture field of the camera begins.

The environment shown in FIG. 1 also comprises a user (103) who is able to interact with the terminal 100. The camera of the terminal 100 captures the eye movements of the user when said user is in its field of capture. The captured data are then processed and analyzed by the terminal 100. As soon as the user gazes at an item in the list of contacts 101, such as for example the item "Alice", the terminal detects this and starts for example a timer or a counter in order to evaluate the duration for which the user's gaze remains directed toward the item "Alice". If the duration is greater than a threshold, then a communication is initiated to Alice. Of course, if the user looks away from the item "Alice" before the timer reaches the threshold value, then the timer is reset and restarts from zero.

The communication that is then initiated may be of any type, such as for example telephone-based, videophone-based, SMS/MMS-based, text-based, a data transfer, etc.

According to one particular embodiment of the invention, when the threshold is reached, the terminal 100 sends a communication request message to Alice (i.e. her terminals). Alice may then, in return, send a message indicating that a bidirectional communication, such as a telephone or videophone communication, may be established. At this time, the user of the terminal 100 will have the option of validating or not validating the establishment of the communication. This validation may be performed at the terminal 100 via a human-machine interface such as a graphical interface, a voice command, or else automatically according to rules predefined by the user, such as the date, the time, the called party, etc.

According to one particular embodiment of the invention, when the threshold is reached, a validation step on the part of the user may be necessary before the communication is initiated to Alice. This validation may be performed at the terminal 100 via a human-machine interface such as a graphical interface, a voice command, or else automatically according to rules predefined by the user, such as the date, the time, the called party, etc.

According to one particular embodiment of the invention, the area to be stared at by the user to trigger the establishment of the communication may be all or part of the device integrated into the terminal 100. This may be a physical element forming part of the terminal, such as for example the camera, a light-emitting diode, a button or else a contextual area of the screen.

It should be noted that the threshold value may be configured by the user depending on the type of use of the user interface, such as for example the level of depth in a tree structure or else a schedule or a date.

FIG. 2 illustrates an example of a display rendered by the terminal 100 of the method for establishing a communication to at least one terminal by analyzing the eye movements of a user in connection with the environment illustrated by FIG. 1. When the user gazes at the item "Alice" in the list of contacts, the timer starts and a progress bar (202) is displayed and indicates the progress status and/or the progress percentage of the value of the timer in relation to the threshold value to be reached for establishing the communication. When the timer reaches the threshold value, for example 5 seconds, the progress bar is then full and the communication to Alice is established.

If the user looks away from the item "Alice" before the progress bar is full and therefore before the timer reaches the threshold value, the timer restarts from zero and the progress bar disappears or returns to zero. This embodiment makes it possible to visually inform the user of the starting of the timer and of the time when the communication request will be established.

In this example, the progress bar is for example displayed superimposed on the item "Alice", but may be displayed in any form for illustrating the progress of the timer and at any location of the human-machine interface visible to the user and displayed by the terminal.

According to one particular embodiment of the invention, the user feedback regarding the progress of the timer may also be given through sounds. When the user gazes at the item "Alice" in the list of contacts, a sound is emitted by the device so as to indicate that the timer has started. When the timer reaches the threshold value, for example 5 seconds, a new sound is then played so as to indicate that the communication with Alice is being established. It should be noted that the sounds may vary in terms of duration or intensity or change tone depending on the context, such as for example the contact selected by the user's gaze. If the user looks away from the item "Alice" before the second sound is played and therefore before the timer reaches the threshold value, then the timer restarts from zero.

The user feedback may also be given through a sound played continuously over the duration for which the user's gaze remains directed toward the item "Alice". The sound is then emitted by the device when the timer is started and stops when the timer reaches the threshold value, indicating the establishment of the communication to Alice. The sound may vary in terms of intensity or change tone during this time period. If the user looks away from the item "Alice" before the sound stops and therefore before the timer reaches the threshold value, then the timer restarts from zero.

According to one particular embodiment of the invention, the user feedback regarding the progress of the timer may also be given through vibrations. When the user gazes at the item "Alice" in the list of contacts, a vibration is emitted by the device so as to indicate that the timer has started. When the timer reaches the threshold value, for example 5 seconds, a new vibration is then emitted so as to indicate that the communication with Alice is being established. It should be noted that the vibrations may vary in terms of duration and/or intensity depending on the context, such as for example the contact selected by the user's gaze. If the user looks away from the item "Alice" before the second vibration is played and therefore before the timer reaches the threshold value, then the timer restarts from zero. The user feedback may also be given through a vibration played continuously over the duration for which the user's gaze remains directed toward the item "Alice". The vibration is then emitted by the device when the timer is started and stops when the timer reaches the threshold value, indicating the establishment of the communication with Alice. The vibration may vary in terms of intensity during this time period. If the user looks away from the item "Alice" before the vibration stops and therefore before the timer reaches the threshold value, then the timer restarts from zero. According to a second embodiment, Alice has a similar terminal, including a device for establishing a communication to at least one terminal by analyzing the eye movements of a user according to one embodiment of the invention. In this case, another timer may be initialized on the user's device, so as to indicate to said user the time during which Alice may respond favorably to his communication request.

FIG. 3 illustrates a device 300 configured so as to implement the method for establishing a communication to at least one terminal by analyzing the eye movements of a user, according to one particular embodiment of the invention. The device 300 has the conventional architecture of a smartphone-type mobile telephone, and comprises in particular a memory MEM, a processing unit UT, equipped for example with a processor PROC, and driven by the computer program PG stored in memory MEM. The computer program PG comprises instructions for implementing the steps of the method for establishing a communication to at least one terminal by analyzing the eye movements of a user as described above when the program is executed by the processor PROC.

On initialization, the code instructions of the computer program PG are for example loaded into a memory, before being executed by the processor PROC. The processor PROC of the processing unit UT in particular implements the steps of the method for establishing a communication to at least one terminal by analyzing the eye movements of a user according to any one of the particular embodiments described with reference to FIGS. 1 and 2 according to the instructions of the computer program PG.

The device 300 comprises a communication module COM configured so as to establish communications with an IP and/or circuit-switched network. It also comprises a camera (CAM) for capturing eye movements. The captured eye movements are then analyzed by the module CALC. This module makes it possible for example to determine whether the user's gaze is directed toward an area of interest located on the device. It should be noted that it is possible for the analysis step to be preceded by a recording step for recording the eye movements in the memory MEM of the device. The eye movement analysis is then transmitted to the module DETX, which will determine whether the user's gaze remains directed toward an area of interest of the device for a duration greater than a threshold value. To this end, it has a timer or a counter that it will start as soon as the user's gaze is directed toward an area of interest. When the timer or the counter reaches the threshold value, for example 5 seconds for a timer, a communication is established by the module COM to a called party/terminal associated with the area of interest stared at by the user. Of course, if the user looks away from the area of interest of the device before the timer reaches the threshold value, then the timer restarts from zero and no communication is established.

According to one particular embodiment, the device for establishing a communication to at least one terminal by analyzing the eye movements of a user (300) comprises a display module (DISP), such as for example a screen, designed to display data for establishing communications via the module COM. The displayed information may be for example a list of contacts, images, or graphical elements with which there are associated for example telephone numbers, e-mail addresses, pseudonyms or any other item of data for establishing a communication with for example people (i.e. terminals), conversational assistants or institutional services. The module DISP also makes it possible to display the progress bar indicating the duration before the communication is established.

According to one particular embodiment, the device for establishing a communication to at least one terminal by analyzing the eye movements of a user (300) comprises a vibrator motor module (VIB) designed to render, through vibrations, the information indicating the duration before the communication is established.

According to one particular embodiment of the invention, the device for establishing a communication to at least one terminal by analyzing the eye movements of a user (300) comprises an audio module (AUD), such as for example a loudspeaker, designed to render, through sounds, the information indicating the duration before the communication is established.

According to another embodiment, the modules described above may be distributed over one or more computing machines such as computers, terminals or servers.

FIG. 4 illustrates the main steps of the method for establishing a communication to at least one terminal by analyzing the eye movements of a user, according to one particular embodiment of the invention. The method is executed simultaneously on two devices D1 and D2 for establishing a communication to at least one terminal by analyzing the eye movements of a user. Each device is contained within a terminal as described with reference to FIGS. 1 and 2. This mode of implementation of the invention makes it possible to trigger informal communication remotely and spontaneously. When the two users look at the contact card of one another simultaneously or with a slight delay, a negotiation is established between the two devices through the exchanged messages, and the communication may be established.

In the first step D1_CAPT, the method P1 executed on the device D1 will use the camera of the device D1 to capture the eye movements of a user D1U located in its capture field. The captured eye movements are then analyzed in the second step D LANA. This step makes it possible for example to determine whether the user's gaze remains directed toward an area of interest located on the device D1. The method P2 executed on the device D2 will perform the same steps, respectively D2_CAPT and D2_ANA for a second user D2U.

In this example, the areas of interest of the devices D1 and D2, integrated into the smartphones of the users D1U and D2U, are respectively the contact cards of the users of the devices D2 and D1.

Once the captured eye movements have been analyzed, the method P1 will move to the following step D1_DECT. This step will make it possible to determine whether the gaze of the user D1U remains directed toward the contact card of the user D2U displayed on the screen of the device D1 contained within the first terminal for a given duration. This duration may for example be evaluated by way of a counter or a timer that will be started as soon as the user's gaze remains directed toward the contact card of the user D2U. The method may also apply a time delay, for example of a few milliseconds, before starting the counter or the timer. When the threshold value is reached, for example 5 seconds for a timer, the method moves to step D1_SND and sends a message to the device D2U indicating to it that the user D1U wishes, via the device D1, to establish a communication with the device D2 and its user D2U.

Likewise, the method P2 will move to the next step D2_DECT. This step will make it possible to determine whether the gaze of the user D2U remains directed toward the contact card of the user D1U displayed on the screen of the device D2 for a given duration. This duration may for example be evaluated by way of a counter or a timer that will be started as soon as the user's gaze remains directed toward the contact card of the user D1U. The method may also apply a time delay, for example of a few milliseconds, before starting the counter or the timer. When the threshold value is reached, for example 5 seconds for a timer, the method moves to step D2_SND and sends a message to the device D1U indicating to it that the user D2U wishes, via the device D2, to establish a communication with the device D1 and its user D1U.

If the message sent by the device D1 to the device D2 is received by D2 while the method P2 is at step D2_DECT and the timer or the counter has reached the threshold value, the communication is established by the device D2 with the device D1. The communication may also be established as soon as D2 receives the message sent by D1, and even before the timer or the counter reaches the threshold value.

According to one variant, the user 2 may decline or validate the establishment of the communication at the end of step D2_DECT and before sending a message to the device D1U indicating that the user D2U wishes, via the device D2, to establish a communication with the device D1 and its user D1U. This validation or cancellation of the establishment of the communication may for example be implemented through a particular eye movement, a head movement, a voice command, the pressing of a hardware or software button, or any other interaction with the human-machine interface of the device D2.

According to one particular embodiment, a message may be sent by D2 to D1, in response to the message received by D2 and sent by D1, indicating to D1 that the method P2 is at step D2_DECT and that D1 has the option of establishing the communication.

Likewise, if the message sent by the device D1 to the device D2 is received by D2 while the method P2 is at step D2_SND and the sending of the message to D1 has not yet taken place, the communication may be established by the device D2 with the device D1.

According to one particular embodiment, a message may be sent by D2 to D1, in response to the message received by D2 and sent by D1, indicating to D1 that the method P2 is at step D2_SND and that D1 has the option of establishing the communication.

According to one variant, the user D2U may, once the communication has been established with the user D1U, transfer the call by staring at the contact card of a third user.

According to another variant, one of the two users may, during communication, stare at a new contact card in order to start a conference with three or more.

FIG. 5 illustrates the main steps of the method for establishing a communication to at least one terminal by analyzing the eye movements of a user when the message requesting establishment of a communication M1 sent by the device D1 to the device D2 is received by the device D2 a few moments before the method P2 starts. The environment is as described with reference to FIGS. 1, 2 and 4.

In this example, the message M1 requesting establishment of a communication sent by the device D1 is received by D2 3 seconds before the method P2 starts on the device D2; that is to say before step D2_CAPT begins. Once it has been received by D2, the message has for example a validity duration of 10 seconds. This duration may of course be configured, for example depending on the services or the user. On receipt of the message, D2 will then start a timer or a counter for determining whether the establishment request M1 sent by D1 is still valid.

Thus, if the method P2 validates step D2_DECT and the message M1 is still valid, that is to say if the timer started upon receipt of the message M1 is below 10 seconds, the communication C1 is established by the device D2 with the device D1. According to one particular embodiment, the method P2 may send D1 a communication establishment request M2. In return, D1 establishes the communication C1'.

It goes without saying that the embodiment that has been described above has been given purely by way of wholly nonlimiting indication, and that numerous modifications may easily be made by those skilled in the art without, however, departing from the scope of the invention.

The invention claimed is:

1. A method for establishing a communication to at least one terminal of at least one second user by analyzing eye movements of a first user, said method being implemented by a device for establishing a communication by analyzing the eye movements of said first user, said device having at least one camera and at least one area of interest associated, via an item of identification data, with said at least one terminal of said at least one second user, and wherein the method comprises:

said camera capturing the eye movements,
analyzing the captured eye movements,
evaluating a duration for which the analysis of the eye movements indicates that a gaze of said first user remains directed toward said area of interest, and
in response to the evaluation indicating that this duration is greater than a threshold, transmitting at least one first message to said at least one terminal identified via said item of identification data.

2. The method as claimed in claim 1, wherein the transmitting is followed by:
said camera capturing further eye movements,
analyzing the captured further eye movements, and
in response to the analysis of the captured further eye movements indicating that the gaze of said first user is no longer directed toward said area of interest,
transmitting at least one third message to said at least one terminal identified via said item of identification data.

3. The method as claimed in claim 1, wherein said at least one first message is a message requesting establishment of a bidirectional communication between said device and said at least one terminal.

4. The method as claimed in claim 1, wherein the transmitting is followed by:
receiving at least one second message from said at least one terminal,
a validation on said device.

5. The method as claimed in claim 1, wherein the area of interest is at least part of a screen.

6. The method as claimed in claim 5, wherein the area of interest is a contact card associated with said at least one second user.

7. The method as claimed in claim 1, wherein said duration is rendered on the device via a progress bar.

8. The method as claimed in claim 1, wherein said duration is rendered on the device via a sound or a vibration.

9. The method as claimed in claim 1, wherein the transmitting is preceded by a validation on the device performed by the first user.

10. A method for communication between a first terminal of a first user and a second terminal of a second user each comprising a device for establishing a communication to at least one terminal by analyzing eye movements of a user, said terminals having at least, respectively, a first and a second camera and at least, respectively, a first and a second area of interest associated, respectively, with the second and with the first terminal, and wherein the method comprises:
said camera of said first terminal capturing the eye movements of said first user,
said camera of said second terminal capturing the eye movements of said second user,
said first terminal analyzing the eye movements captured by said first terminal,
said second terminal analyzing the eye movements captured by said second terminal,
said first terminal evaluating a first duration for which the analysis of the eye movements indicates that a gaze of the user of the first terminal remains directed toward said first area of interest, and in response to the evaluation indicating that this duration is greater than a first threshold, said first terminal transmitting at least one first message to said at least one second terminal,
said second terminal evaluating a second duration for which the analysis of the eye movements indicates that a gaze of the user of the second terminal remains directed toward said second area of interest, and in response to the evaluation indicating that this second duration is greater than a second threshold, said second terminal transmitting at least one second message to said at least one first terminal,
establishing a communication between said first terminal and said second terminal if said at least one second message is received, following the transmitting performed on said first terminal, by said at least one first terminal within a time interval.

11. The method as claimed in claim 10, wherein the transmitting performed on said first terminal is followed by rendering, on said first terminal, a second period representing said time interval for which the reception of said at least one second message by said first terminal allows the communication to be established.

12. A device for establishing a communication to at least one terminal of at least one second user by analyzing eye movements of a first user, wherein the device comprises:
at least one camera, and at least one area of interest associated, via an item of identification data, with said at least one terminal of said at least one second user,
a transceiver configured to transmit at least one first message to said at least one terminal identified via said item of identification data,
an analysis module configured to analyze the eye movements of said first user as captured by said camera, and
an evaluation module configured to evaluate a duration for which the analysis of the eye movements indicates that a gaze of the first user remains directed toward said area of interest.

13. A terminal, which comprises the device for establishing a communication as claimed in claim 12.

14. A system for communication between a first and a second terminal, the terminals respectively comprising the device for establishing a communication as claimed in claim 12, wherein the transceiver of the first terminal also allows reception of at least one second message transmitted by said second terminal and establishment of a communication to said second terminal.

15. A non-transitory computer-readable medium comprising instructions stored thereon for implementing a method for establishing a communication to at least one terminal of at least one second user by analyzing eye movements of a first user, when the instructions are executed by a processor a device of the first user, said device having at least one camera and at least one area of interest associated, via an item of identification data, with said at least one terminal of said at least one second user, and wherein the method comprises:
said camera capturing the eye movements,
analyzing the captured eye movements,
evaluating a duration for which the analysis of the eye movements indicates that a gaze of said first user remains directed toward said area of interest, and
in response to the evaluation indicating that this duration is greater than a threshold,
transmitting at least one first message to said at least one terminal identified via said item of identification data.

* * * * *